G. STAPLES.
ANTISKID DEVICE.
APPLICATION FILED AUG. 11, 1919.
1,379,059.
Patented May 24, 1921.
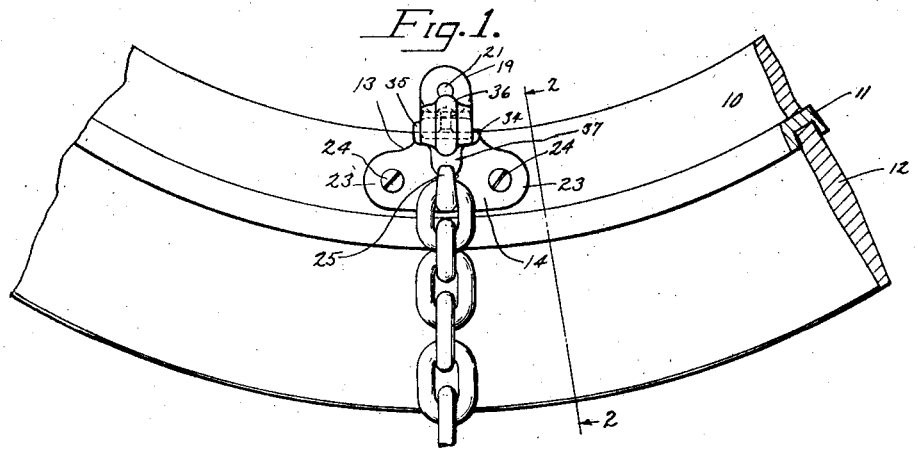
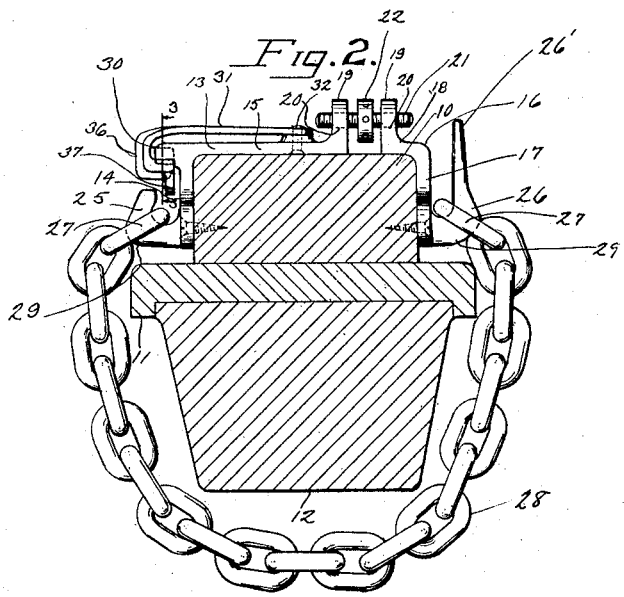
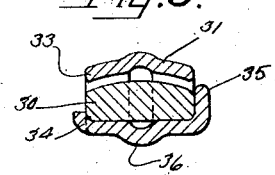
WITNESS:
Ira M. Jones
INVENTOR.
George Staples
BY
Morsell + Keeney
ATTORNEYS

UNITED STATES PATENT OFFICE.

GEORGE STAPLES, OF OSHKOSH, WISCONSIN, ASSIGNOR TO STAPLES AND SEEFELD, OF MILWAUKEE, WISCONSIN, A MILWAUKEE PARTNERSHIP.

ANTISKID DEVICE.

1,379,059.      Specification of Letters Patent.      Patented May 24, 1921.

Application filed August 11, 1919. Serial No. 316,844.

*To all whom it may concern:*

Be it known that I, GEORGE STAPLES, a citizen of the United States, and resident of Oshkosh, in the county of Winnebago and State of Wisconsin, have invented new and useful Improvements in Antiskid Devices, of which the following is a description, reference being had to the accompanying drawings, which are a part of this specification.

The present invention relates to an antiskid device of the character wherein a chain is attached to the felly and extends about the tire so as to lie between the contacting surface of the tire and the road bed.

An object of the invention is to provide means for attaching the chain to the felly of the wheel, so that the chain may be readily detached when desired, and so that when said chain is attached to the wheel, it will extend closely about the tire.

Another object of this invention is to provide a novel form of felly engaging bracket which may be adjusted to adapt the same for use with fellies of various widths.

A further object is to provide the antiskid chain securing hook members which will be so constructed as not to project outwardly beyond the wheel rim and thus danger of breakage when the wheel is scraped upon a curbing or is struck a glancing blow by some obstacle is prevented.

A still further object of this invention is to provide a novel form of pivoted latch means coöperating with one of the chain receiving hook members to prevent the accidental disengagement of the chain from the hook members, said latch being releasable by movement in only one direction.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a view in side elevation showing a portion of a vehicle wheel having my improvements applied thereto.

Fig. 2 is a transverse sectional view taken through the wheel on the line 2—2 of Fig. 1.

Fig. 3 is an enlarged detailed sectional view illustrating the manner of releasably locking the spring latch in closed position, said view being taken on the line 3—3 of Fig. 2.

In the drawing, 10 designates a vehicle wheel felly, 11 a tire rim secured to the outer surface thereof, and 12 a tire which in the present instance is illustrated as being a solid rubber tire. My device includes a two-part bracket member including an angular member 13, having a felly side engaging portion 14 and an inner felly face engaging portion 15, and an angular member 16 having a felly side engaging portion 17 and an inner felly face engaging portion 18, both of said members being adjustably connected together by means now to be described.

The inner ends of the portions 15 and 18 of the angular members are inwardly flanged or turned, as at 19, and have formed therein oppositely threaded alined bores or apertures 20 for receiving the oppositely threaded ends of a turn buckle screw 21 having an operating head 22 disposed intermediate the flanges 19. By this structure, it will be readily seen that the screw 21 may be manipulated to increase or decrease the distance between the felly side engaging portions 14 and 17 to adapt the same for use on fellies of various widths. The portions 14 and 17 are provided with apertured ears or lugs 23 for receiving securing screws 24 to firmly position the same upon the felly, although it will be understood that the turnbuckle screw 21 may be manipulated to bind angular members 13 and 16 upon the felly.

Formed on portions 14 and 16 are hook members 25 and 26 respectively adapted to detachably receive the ends 27 of an antiskid chain or member 28. As best shown in Fig. 2 the hook members 25 and 26 are substantially larger at their base portions and corner portions 29 so that in the event of the wheel scraping along a gutter or being struck a glancing blow by some obstacle in the road, but slight damage will be done to the hooks.

In most wheel structures, the rim 11 projects outwardly from the sides of the felly some distance, as best shown in Fig. 2, and this projection also protects the hook members 25 and 26 from damage by the scraping of the wheel along a curbing. It will be noted that the hook 26 has its end elongated and tapered, as at 26′, and that the hook 25 is considerably shorter and terminates at a distance spaced from a projecting lug 30 extended outwardly from the apex of the angular member 13. The passageway or distance between the end of hook member 25 and the lug 30 is just sufficient to allow the adjacent end of the chain 28 to pass therethrough to engage said hook.

As the end 26′ of the hook 26 is substantially longer than the end of hook 25, when the ends of the anti-skid chain 28 are engaged with the hooks, it will be impossible to remove the end 27 engaging hook 26 without first disengaging the other end from the hook 25, and in order to lock the chain about the tire 12 I provide a novel form of spring clip or catch 31 which closes or sufficiently reduces the width of the slot between lug 30 and the end of hook 25 to prevent the accidental removal of the adjacent end 27 of the chain from the hook 25. The catch or clip 31 is pivoted, as at 32, to the portion 15 of the angular member 13 adjacent its flange 19 and has its outer end bent or struck laterally and then inwardly to provide a receiver 33 for locking engagement with the lug 30.

As best shown in Figs. 2 and 3, the end of the spring latch 31 forming the receiver 33 has its edges flanged inwardly, as at 34 and 35, to engage the sides of the lug 30 when engaged therewith, and the flange 35 is of a height sufficient to prevent the movement of the latch 31 in but one direction to and from engagement with the lug 30. The larger flange 35 is preferably on the side so that the latch 31 must be moved in a direction opposed to the normal direction of rotation of the wheel so that in case of the same being struck by some obstacle that it will not become unlatched.

The latch 31 is preferably stamped from a single piece of spring metal and has formed on its outer end a reinforcing rib 36. To engage the keeper 33 with the lug 30, the latch is depressed and moved on its pivot so that the flange 34 will pass under the lug 30 and when the flange 35 abuts the adjacent side of lug 30, the same is allowed to spring inwardly under its own tension and become locked in position.

An outwardly extending lip or projection 37 is formed on the lip 31 which projects into the adjacent hook 25 a slight distance to prevent the adjacent eye 27 from becoming wedged in the space between the top of the hook 25 and the end of the latch.

What I claim as my invention is:

1. An attaching device for non-skid tread members comprising a member engageable with a vehicle wheel, a hook on said member for detachably receiving a link on one end of a tread member, a pivoted spring latch movable across the throat of the hook to secure the link of the tread member therein, said spring latch having its portion movable across the throat of the hook normally urged inwardly, and means permitting the movement of said latch from its position closing the throat of the hook only after the outer portion of said latch has first been pressed outwardly.

2. An attaching device for non-skid tread members comprising a bracket member engageable with a vehicle wheel, a hook carried by said bracket member for detachably receiving an eye on one end of a tread member, a projection extending over the throat of the hook and spaced therefrom a distance greater than the thickness of the tread member eye, and a spring latch movable to a position engaging said projection to releasably lock the same in position closing the throat of said hook.

3. An attaching device for non-skid tread members comprising a bracket member engageable with a vehicle wheel, a hook carried thereby for detachably receiving a tread member terminal link, and means for closing the throat of said hook to releasably secure the tread member terminal link therein including a spring member movable into the throat of said hook and having a projection adapted to project a slight distance into the throat of the hook to insure a positive locking of the tread member terminal link therein.

4. An attaching device for a non-skid tread member comprising a bracket member engageable with a vehicle wheel, a hook carried thereby for receiving a tread member terminal link, and means for readily releasably securing the terminal link of the tread member in said hook and including a projection spaced above the throat of said hook a distance slightly greater than the thickness of the tread member and a pivoted latch member having its inner end pivotally mounted and its outer end shaped to provide a receiver for engagement over said projection, said receiver closing the throat of the tread member when in engagement over the projection.

In testimony whereof, I affix my signature.

GEORGE STAPLES.